United States Patent
Johnson et al.

(10) Patent No.: US 12,524,733 B2
(45) Date of Patent: Jan. 13, 2026

(54) SYSTEMS AND METHODS FOR HANDLING ITEM PICKUP

(71) Applicant: TOSHIBA GLOBAL COMMERCE SOLUTIONS, INC., Durham, NC (US)

(72) Inventors: Brad M. Johnson, Raleigh, NC (US); J. Wacho Slaughter, Raleigh, NC (US); Yevgeni Tsirulnik, Frisco, TX (US); John Pistone, Cary, NC (US); James L. Frank, Montreal (CA)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/594,763

(22) Filed: Mar. 4, 2024

(65) Prior Publication Data
US 2024/0296416 A1    Sep. 5, 2024

Related U.S. Application Data

(60) Provisional application No. 63/488,293, filed on Mar. 3, 2023.

(51) Int. Cl.
*G06Q 10/0836* (2023.01)
*G01B 11/24* (2006.01)
*G01G 19/52* (2006.01)
*G06V 10/20* (2022.01)

(52) U.S. Cl.
CPC ......... *G06Q 10/0836* (2013.01); *G01B 11/24* (2013.01); *G01G 19/52* (2013.01); *G06V 10/255* (2022.01)

(58) Field of Classification Search
CPC .... G06Q 10/0836; G01B 11/24; G01G 19/52; G06V 10/255
USPC .......................................................... 705/339
See application file for complete search history.

(56) References Cited

U.S. PATENT DOCUMENTS

| | | | |
|---|---|---|---|
| 2002/0138374 A1* | 9/2002 | Jennings | G06Q 10/0875 705/29 |
| 2016/0026032 A1* | 1/2016 | Moore | G06F 3/147 349/1 |
| 2017/0112295 A1* | 4/2017 | McConnell | A47D 15/00 |
| 2018/0365643 A1* | 12/2018 | Zhu | G06K 19/06037 |
| 2019/0304238 A1* | 10/2019 | Ambauen | G06Q 20/40145 |
| 2021/0012635 A1* | 1/2021 | Hill | G08B 13/2434 |
| 2021/0142266 A1* | 5/2021 | Kramarov | G06Q 10/087 |
| 2021/0174431 A1* | 6/2021 | Dhankhar | G01G 19/40 |

(Continued)

OTHER PUBLICATIONS

Scala, "Smart Signage Foundations", Oct. 20, 2021, <https://scala.com/fr/resources/blogs-fr/blog-smart-signage-foundations/> (Year: 2021).*

*Primary Examiner* — Michael P Harrington
*Assistant Examiner* — Brian Tallman
(74) *Attorney, Agent, or Firm* — Patterson + Sheridan, LLP; Gero G. McClellan

(57) ABSTRACT

The present disclosure describes a system and method for holding or storing items. The system includes a pad, a weight sensor, a shape sensor, a memory, and a processor communicatively coupled to the memory. The weight sensor detects a weight of an item when the item is positioned on the pad. The shape sensor detects a shape of the item when the item is positioned on the pad. The processor verifies that the item is positioned on the pad based on the detected weight and the detected shape and communicates a message that the item is positioned on the pad.

9 Claims, 17 Drawing Sheets

(56) References Cited

U.S. PATENT DOCUMENTS

2021/0264752 A1\* 8/2021 Goldman ............... G08B 7/068
2023/0156158 A1\* 5/2023 Moyne ................... H04N 23/60
                                                            348/159

\* cited by examiner

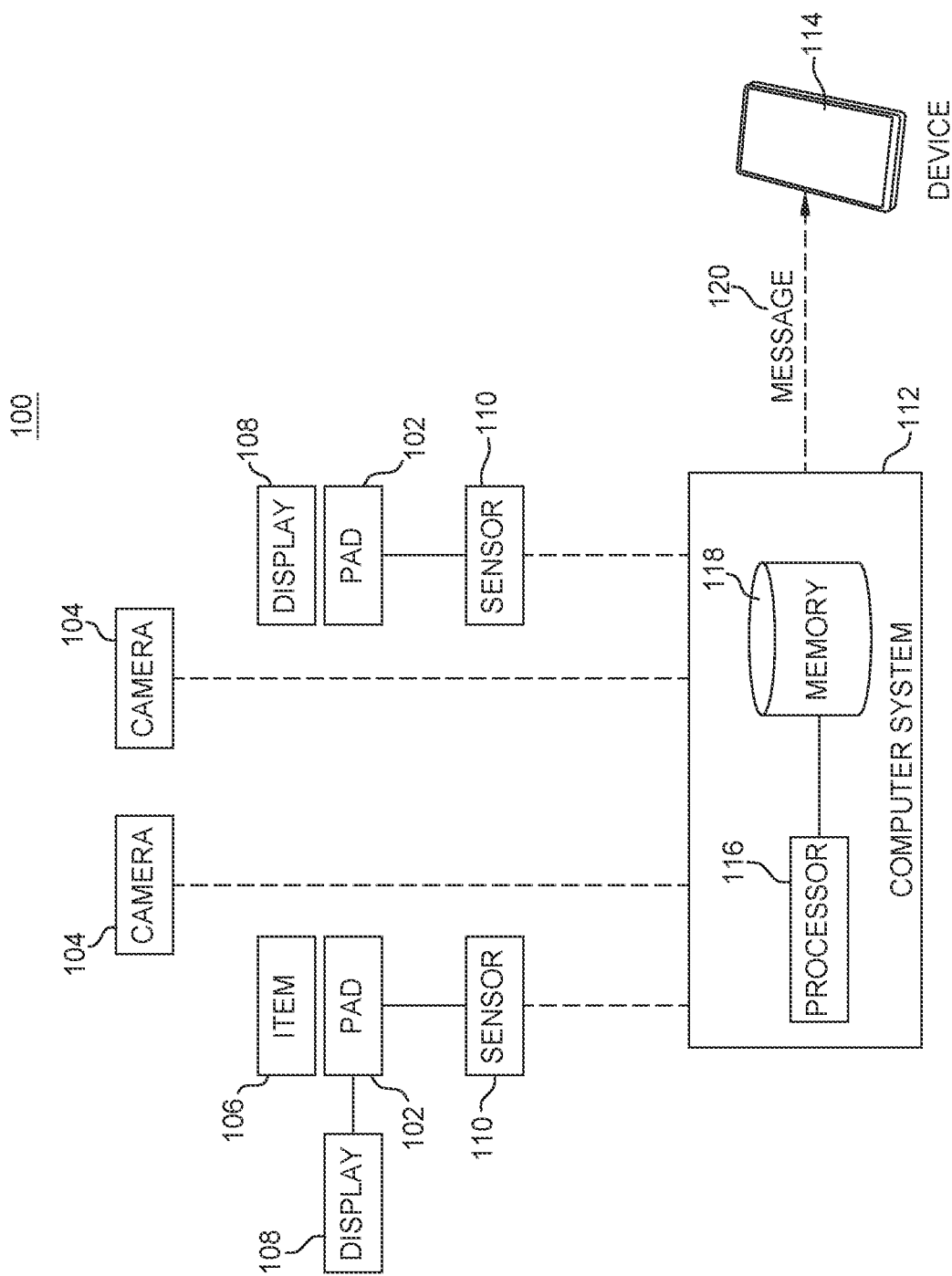

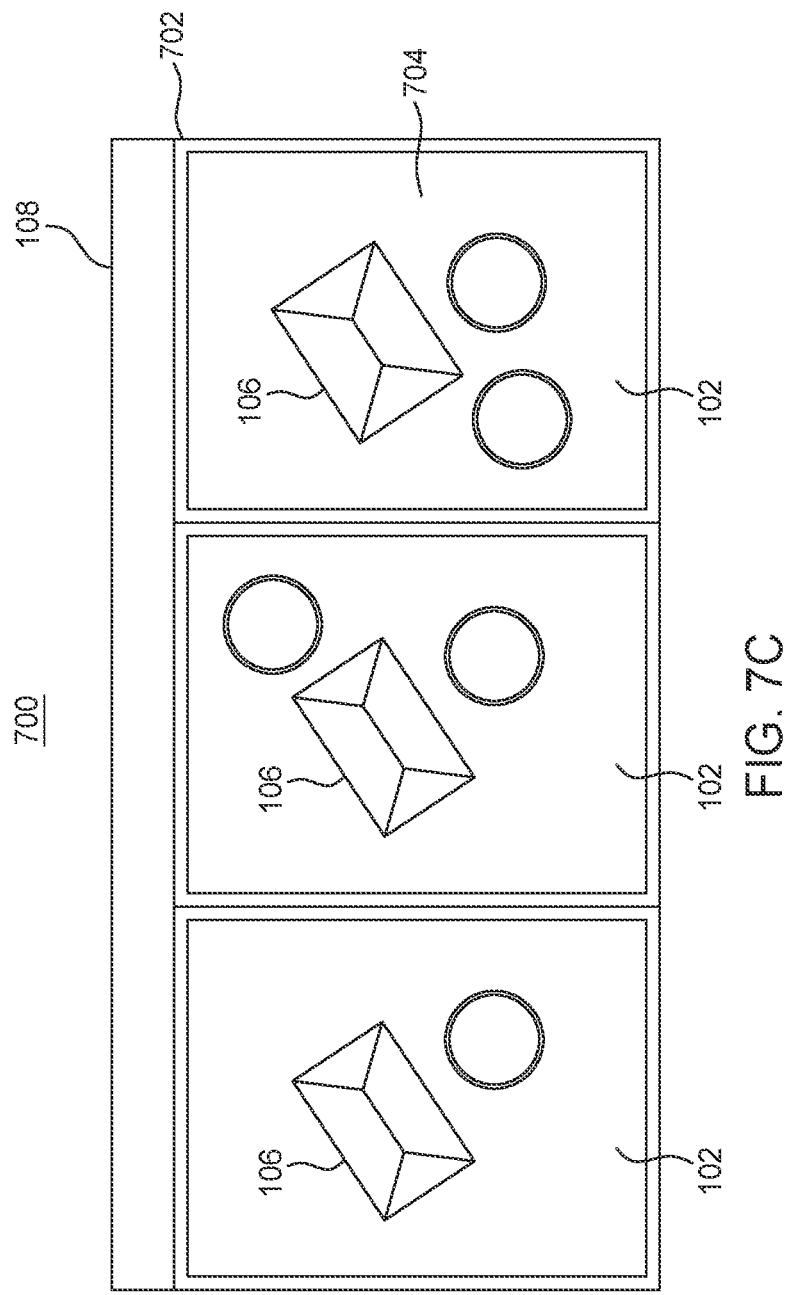

SYSTEMS AND METHODS FOR HANDLING ITEM PICKUP

CROSS-REFERENCE TO RELATED APPLICATIONS

This application claims benefit of and priority to U.S. Provisional Patent Application Ser. No. 63/488,293, filed Mar. 3, 2023 which is herein incorporated by reference in its entirety for all purposes.

BACKGROUND

The present disclosure relates to locations where items may be picked up or retrieved. Generally, stores and restaurants may place ordered items (e.g., products or food) at pickup locations, where customers (which may also be referred to as users or people) can pick up or retrieve their ordered items. The items, however, may not be organized well at these locations. For example, when there are many items awaiting pickup, customers may need to search or examine several items before locating their items. As a result, many customers may touch or breathe on other customers' items, which reduces sanitation and may increase the spread of disease.

As another example, there may be no way to track or verify that a customer has picked up or retrieved the correct order. When customers take incorrect orders, the stores' or restaurants' computer systems may be further strained handling re-orders and complaints. For example, when a customer takes an incorrect order, the customer may write complaints or make calls to complain about the incorrect order. The store's computer system then must expend computer resources for complaint intake and handling and for issuing refunds. As another example, when a customer takes an incorrect order, the customer may send a new order for the correct items. The store's computer system then must expend computer resources intaking and handling another order, which could have been avoided had the customer taken the correct order.

BRIEF DESCRIPTION OF THE SEVERAL VIEWS OF THE DRAWINGS

FIGS. 1A, 1B, 1C, and 1D illustrate an example system.

FIGS. 7A, 7B, and 7C illustrate an example configuration of a pickup location.

DETAILED DESCRIPTION

The present disclosure describes a computerized system for handling a pickup location. Generally, the system includes one or more pads onto which ordered items may be placed. The system may include sensors (e.g., weight sensors and shape sensors) that detect certain properties about the items on the pads (e.g., weight and shape). Using the detected information about the items, the system may verify that the correct items for an order have been positioned on a pad, and the system may notify customers to pick up the items. The system may also indicate to the customers which pad is holding the customers' items. When the customers pick up or retrieve the items, the system may further verify that the items on the correct pads were picked up.

Technical Advantages

The system provides several technical advantages in certain embodiments. For example, the system may indicate to customers where (e.g., from which pad) to pick up their items. In this manner, the system eliminates the need for customers to search or examine through several items to locate the customers' items, which improves sanitation reduces the spread of disease. Additionally, the system reduces the likelihood that customers take incorrect items. As a result, the system reduces the strain that is created on the stores' or restaurants' computer systems by re-orders and complaints stemming from incorrect items being taken, which reduces processor and memory usage in these computer systems.

Figure 1A:
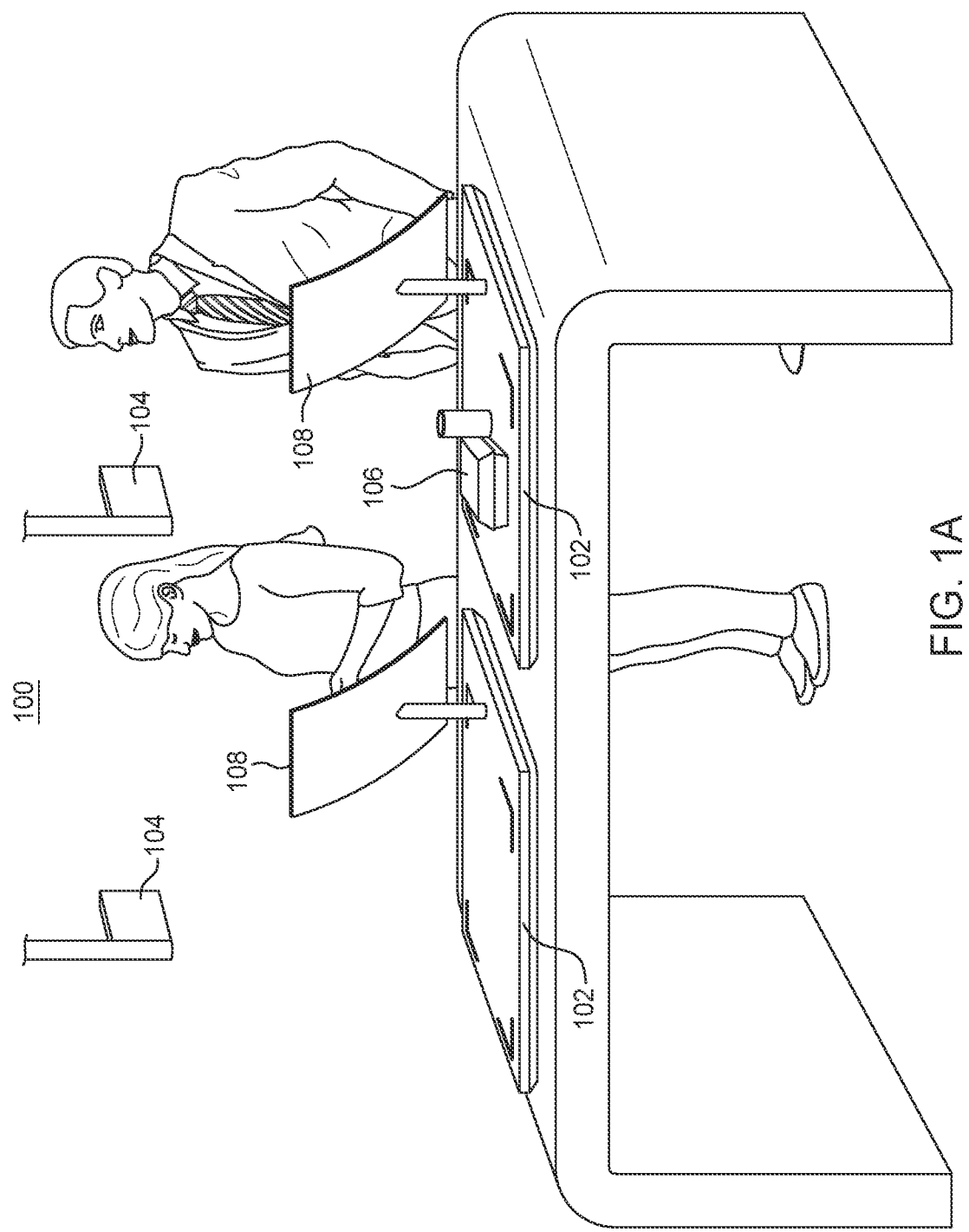
Figure 1B:
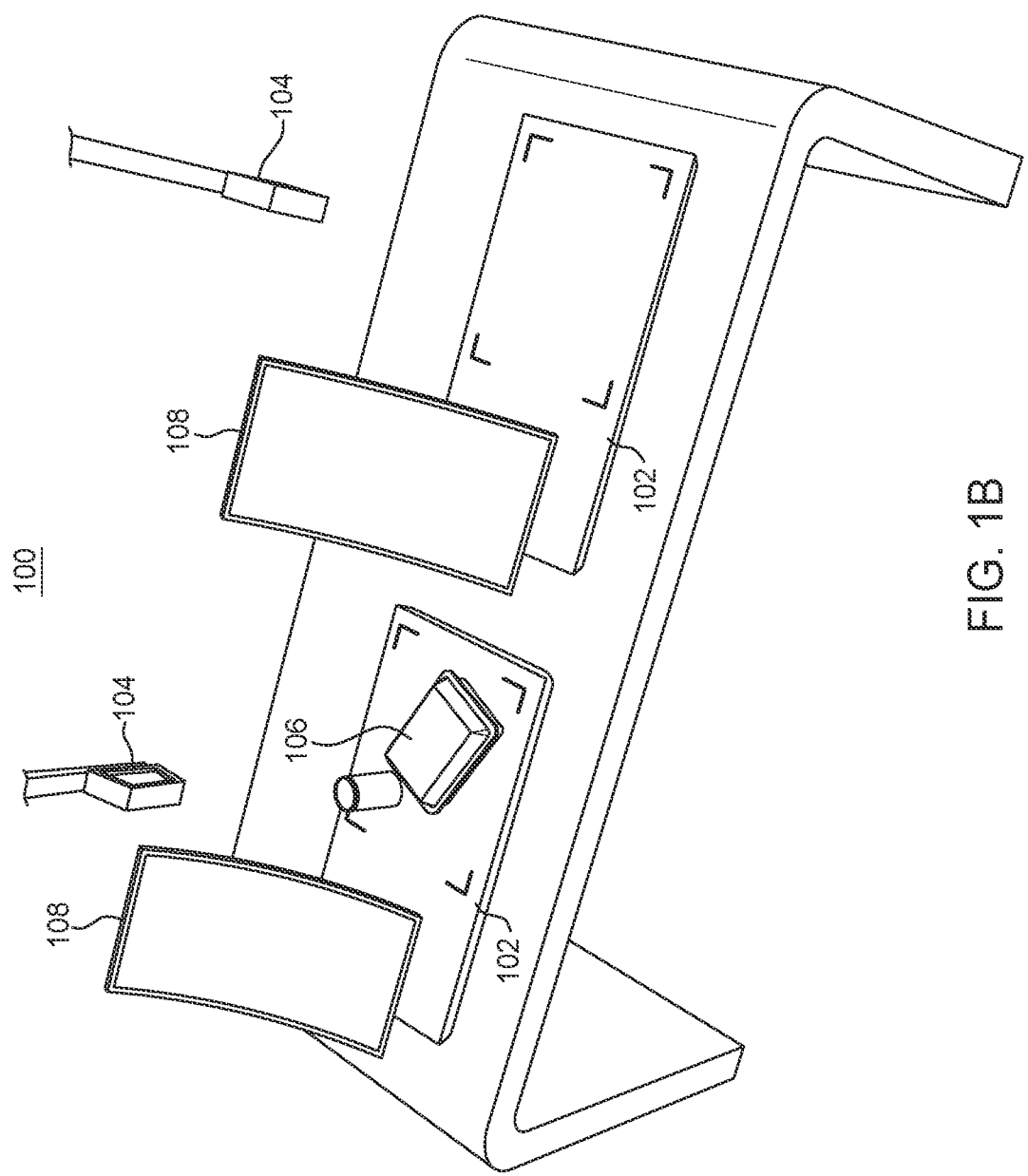
Figure 1C:
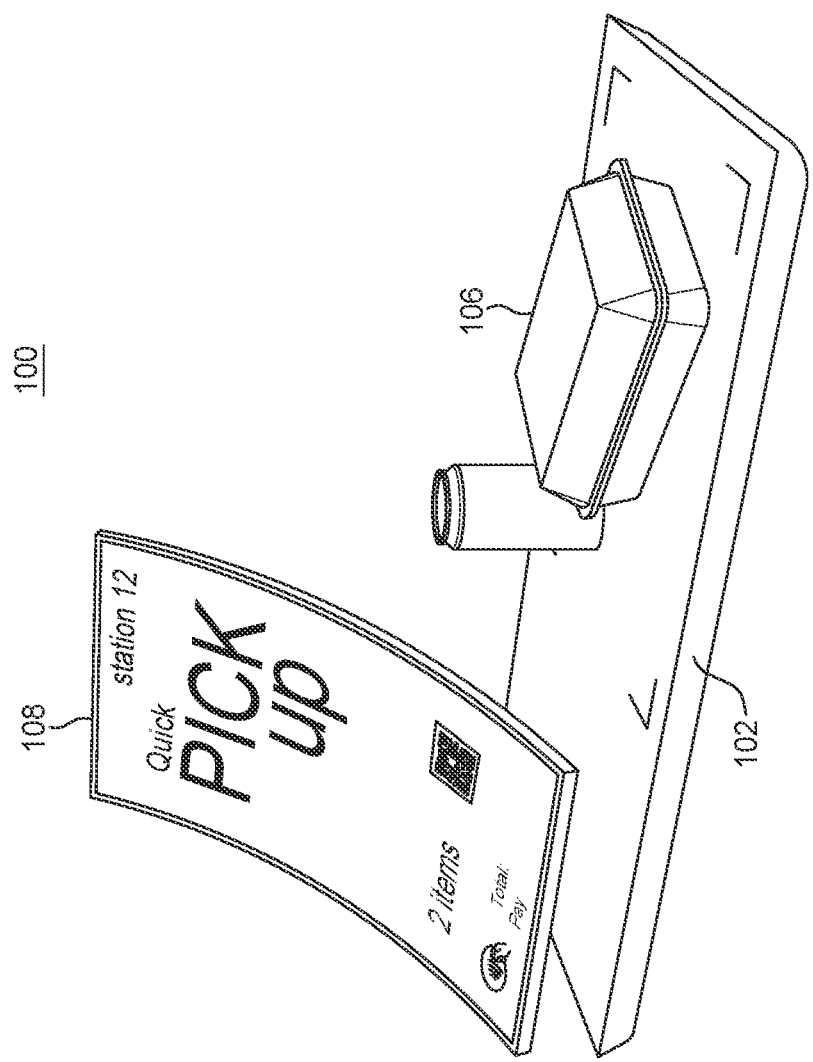

FIGS. 1A, 1B, 1C, and 1D illustrate an example system 100. As seen in FIGS. 1A, 1B, and 1C, the system 100 includes one or more pads 102, one or more cameras 104, items 106, and displays 108. Generally, the items 106 for a customer or order are placed on a pad 102 when the items 106 are ready to be picked up. A weight sensor integrated into the pad 102 may detect the weight of the items 106. A shape sensor (e.g., a camera 104) may detect the shape of the items 106. A computer system (e.g., a server or integrated into the pad 102) may identify the items 106 using the detected weight and shape. The computer system may then verify whether the order is complete and ready for pickup. If the items 106 are ready for pickup, the computer system may communicate a message (e.g., an alert or notification) to a customer to pick up the items 106. The message may indicate that the items 106 are ready for pickup and which pad 102 the items 106 are located. The customer may view the message (e.g., on a personal device) and pick up the items 106 from the indicated pad 102. The computer system may detect (e.g., using the weight sensor and shape sensor) when the items 106 have been removed from the pad 102. The computer system may then close the order.

A camera 104 may be directed at each pad 102. The cameras 104 may capture images or video of the pads 102 and the items 106 on the pads 102. Any suitable number of cameras 104 may be directed at each pad 102 (e.g., to capture images or videos of each pad 102 from different perspectives). In some embodiments, the cameras 104 may serve as shape sensors, and the computer system may use the images or video from the cameras 104 to determine the shape of items 106 positioned on the pads 102. The computer system may identify the items 106 from the shapes of the items 106. The computer system may also use the images or video to determine when the items 106 have been picked up.

The pads 102 may include weight sensors that detect the weights of items 106 positioned on the pads 102. The computer system may use the weights to identify the items 106 on the pads 102. The computer system may also use the weights to determine when the items 106 have been picked up (e.g., when the detected weight for a pad 102 becomes zero).

The pads 102 may also include integrated shape sensors that detect the shapes of the items 106 on the pads 102. The computer system may use the shapes to identify the items 106 on the pads 102.

The computer system may be a server in the system 100 or the computer system may be integrated into each pad 102. The computer system may include a processor and a memory that perform the functions or actions of the computer system. Generally, the computer system detects and verifies that the appropriate items 106 are positioned on a pad 102 using any suitable information (e.g., the weight and shape of the items 106). The computer system may also communicate messages to a customer when the items 106 are ready for pickup. The computer system may also detect when the items 106 have been picked up using any suitable information (e.g., the images or video from the cameras 104 or the detected weight becoming zero). In some embodiments, the computer system may record the time when the items 106 are placed on a pad 102 and the time when the items 106 are picked up.

In certain embodiments, if the computer system detects that a customer has taken the incorrect items 106 (e.g., removed items 106 from the incorrect pad 102), the computer system may communicate an alert (e.g., a flashing light or an audible signal) that alerts an administrator to assist the customer pick up the correct items 106.

The displays 108 may be used to present information at the pads 102. In some embodiments, each pad 102 has a display 108 connected or assigned to the pad 102. In certain embodiments, a group of pads 102 has one display 108 assigned to the group of pads 102. The displays 108 may present any suitable information about the items 106. For example, the displays 108 may identify the customer (e.g., through an order number or assigned name) that should pick up the items 106. The displays 108 may also identify the pads 102 (e.g., through a pad or station number). The displays 108 may further present information about how long the items 106 have been on the pads 102. In some embodiments, the customers may pay for the items 106 by interacting with the displays 108. For example, the displays 108 may have embedded card or chip readers that can read information from the customers' payment cards.

In some embodiments, there may be one or more cameras 104 directed at customers who approach the pickup location. For example, there may be cameras 104 integrated within the displays 108 or hanging from the ceiling near the other cameras 104. These cameras 104 may capture images or video of the customers. These images or videos may be used to detect the presence of the customers and to determine whether the customers are picking up the correct orders.

As seen in FIG. 1D, the system 100 includes pads 102, cameras 104, an item 106, displays 108, sensors 110, a computer system 112, and a device 114. Each pad 102 may be connected to a display 108 and a sensor 110. A camera 104 may be positioned near each pad 102 and may be directed at the pad 102. The sensor 110 may be a weight and/or shape sensor that detects the weight and/or shape of the item 106 positioned on the pad 102.

The computer system 112 may be in communication with one or more of the pads 102, cameras 104, displays 108, sensors 110, and/or device 114. Each of these components may communicate information (e.g., video, weights, shapes, messages etc.) to the computer system 112, and vice versa. As seen in FIG. 1D, the computer system 112 includes a processor 116 and a memory 118, which may perform the functions or features of the computer system 112 described herein.

The processor 116 is any electronic circuitry, including, but not limited to one or a combination of microprocessors, microcontrollers, application specific integrated circuits (ASIC), application specific instruction set processor (ASIP), and/or state machines, that communicatively couples to the memory 118 and controls the operation of the computer system 112. The processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 116 may include other hardware that operates software to control and process information. The processor 116 executes software stored on the memory 118 to perform any of the functions described herein. The processor 116 controls the operation and administration of the computer system 112 by processing information (e.g., information received from the pads 102, cameras 104, displays 108, sensors 110, and/or device 114). The processor 116 is not limited to a single processing device and may encompass multiple processing devices contained in the same device or computer or distributed across multiple devices or computers. The processor 116 is considered to perform a set of functions or actions if the multiple processing devices collectively perform the set of functions or actions, even if different processing devices perform different functions or actions in the set.

The memory 118 may store, either permanently or temporarily, data, operational software, or other information for the processor 116. The memory 118 may include any one or a combination of volatile or non-volatile local or remote devices suitable for storing information. For example, the memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 118, a disk, a CD, or a flash drive. In particular embodiments, the software may include an application executable by the processor 116 to perform one or more of the functions described herein. The memory 118 is not limited to a single memory and may encompass multiple memories contained in the same device or computer or distributed across multiple devices or computers. The memory 118 is considered to store a set of data, operational software, or information if the multiple memories collectively store the set of data, operational software, or information, even if different memories store different portions of the data, operational software, or information in the set.

In an example operation, the computer system 112 detects that the item 106 has been placed on a pad 102. For example, the computer system 112 may determine using video from the camera 104 by the pad 102 and information from the sensor 110 in the pad 102 (e.g., a detected weight), that the item 106 has been placed on the pad 102. The computer system 112 may also determine that the item 106 should be retrieved by a person using the device 114. The computer system 112 communicates a message 120 to the device 114. The message 120 may instruct the person to retrieve the item 106 on the pad 102. The display 108 may present a message identifying the pad 102. The display 108 may also present other identifying information (e.g., order number, name, etc.) that indicates that the person should retrieve the item 106 from the pad 102. In this manner, the computer system 112 may ensure that the person retrieves the correct items 106 from the system 100, which reduces the computing resources that the computer system 112 would use to handle or process re-orders and complaints stemming from incorrect items being taken.

The system 100 may include any number of pads 102, cameras 104, displays 108, and/or sensor 110. Additionally, the pads 102, cameras 104, displays 108, and/or sensor 110 may be arranged as a pickup location in any configuration. Different configurations of pickup locations may be used to support different types of items 106 and different types of environments.

Figure 2A:
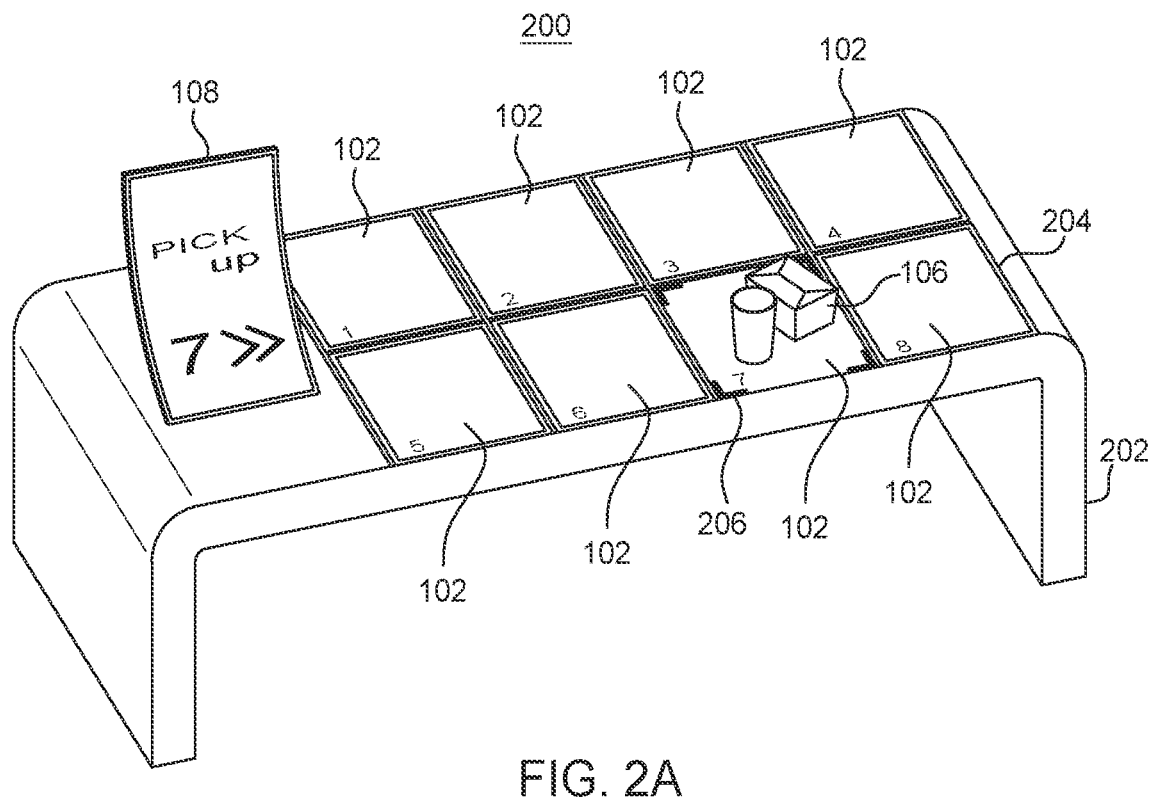
FIGS. 2A and 2B illustrate an example configuration of a pickup location.
Figure 2B:
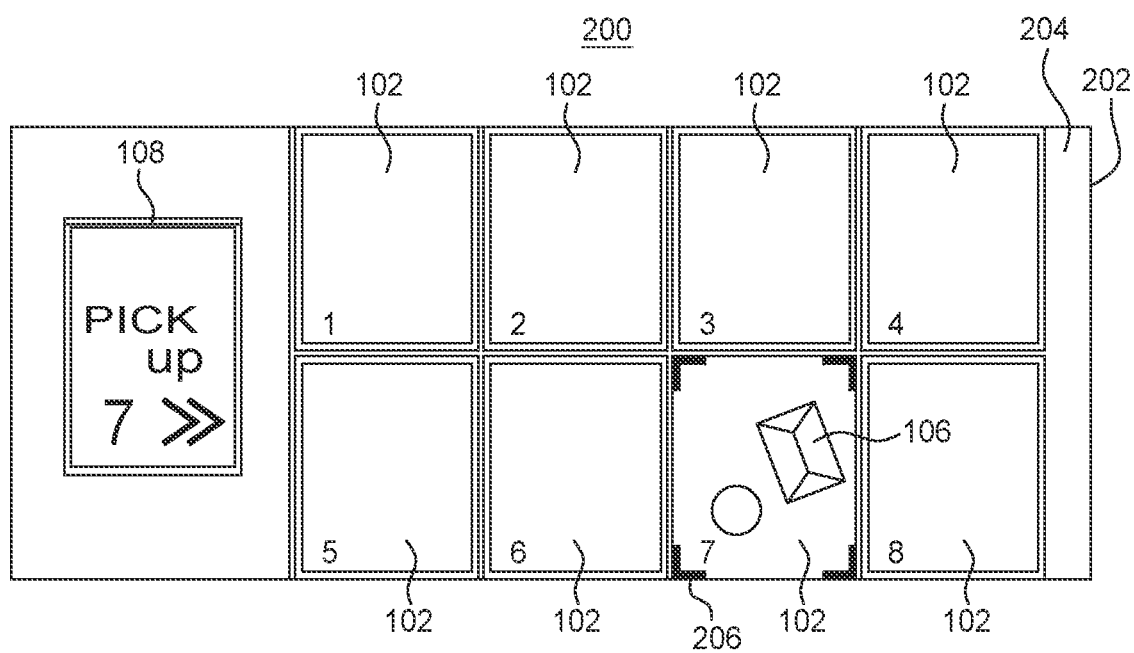

FIGS. 2A and 2B illustrate an example configuration 200 of a pickup location. FIG. 2A presents an isometric view of the pickup location. FIG. 2B presents a top-down view of the pickup location. As seen in FIGS. 2A and 2B, the pickup location includes multiple pads 102 arranged on a table 202. The pads 102 are arranged on a top surface 204 of the table 202. One display 108 is also connected to the table 202. Items 106 may be placed on a pad 102, and the display 108 may be used to instruct a customer which pad 102 has the customer's order. In some embodiments, the pad 102 includes a light 206 that activates (e.g., illuminates) to provide additional indication that the customer's order is at that pad 102. The light may be arranged along a perimeter of the pad 102 such that the light encircles the item 106.

The pads 102 may be arranged in a grid formation on the top surface 204 of the table 202. Each pad 102 may form a zone or area in which items 106 may be placed. Cameras 104 may be positioned over the table to capture video of the pads 102. A camera 104 may monitor or capture video of multiple pads 102. Each pad 102 may also include a sensor 110 (e.g., a weight sensor or shape sensor) that detects items 106 placed on the pad 102. For example, the sensor 110 may detect the weight or shape of the item 106 on the pad 102.

The display 108 may be used to present messages to a customer that approaches the table 202. For example, the display 108 may present a message identifying the pad 102 that has the customer's items 106. In some embodiments, the customer presents information that identifies the customer (e.g., by scanning a code, presenting a radio frequency identification tag, using near field communication, etc.). The display 108 may present instructions to the customer after the customer has been identified. The customer may then retrieve the items 106 from the identified pad 102.

Figure 3A:
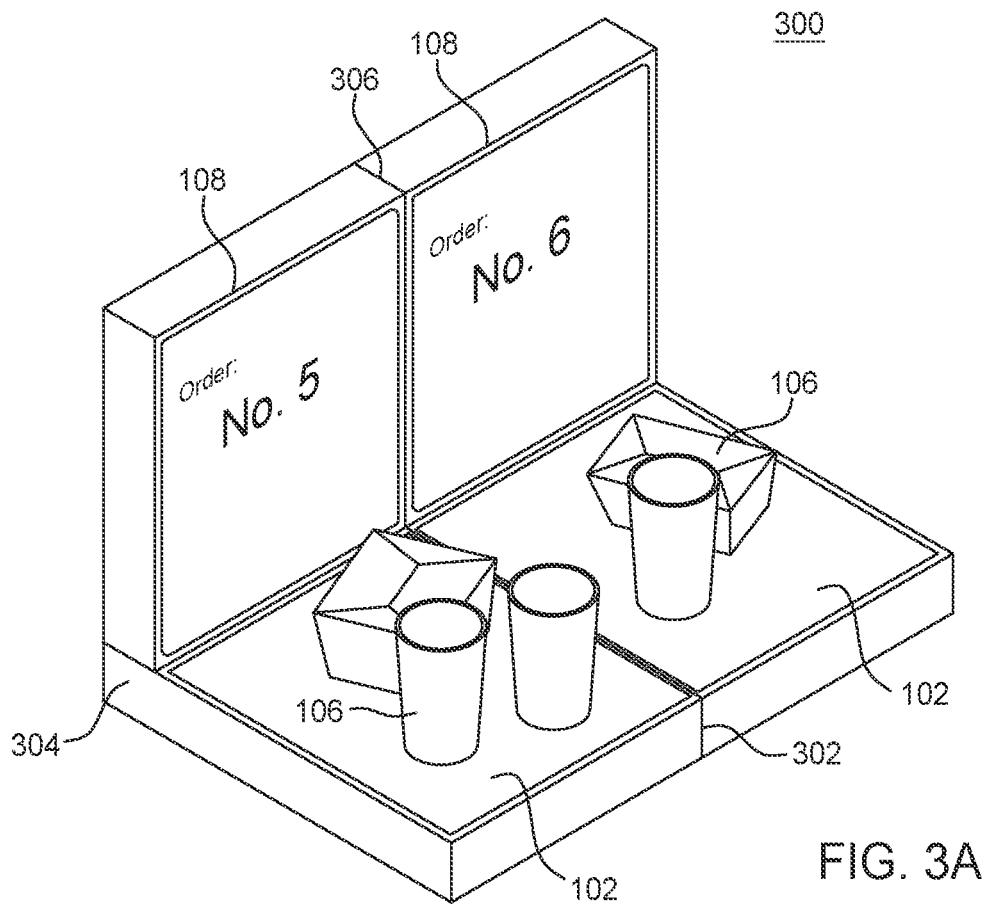
FIGS. 3A and 3B illustrate an example configuration of a pickup location.
Figure 3B:
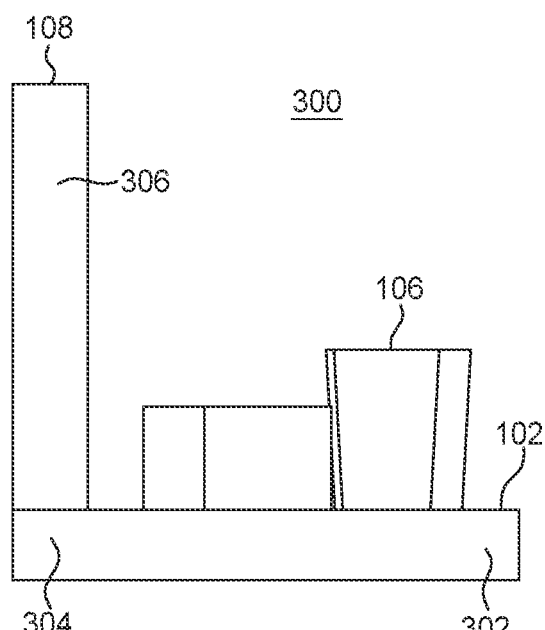

FIGS. 3A and 3B illustrate an example configuration 300 of a pickup location. FIG. 3A presents an isometric view of the pickup location. FIG. 3B presents a side view of the pickup location. As seen in FIGS. 3A and 3B, multiple pads 102 may be coupled or connected together. The pads 102 may form distinct zones at the pickup location, and different items 106 from different orders may be positioned in the different zones. Additionally, each pad 102 may have a display 108 that forms a backstop for the pad 102 surface. The display 108 may present information about the order (e.g., identify the customer for the order, identify the items 106 in the order, etc.). Cameras 104 may be positioned over the table to capture video of the pads 102. A camera 104 may monitor or capture video of multiple pads 102. Each pad 102 may also include a sensor 110 (e.g., a weight sensor or shape sensor) that detects items 106 placed on the pad 102. For example, the sensor 110 may detect the weight or shape of the item 106 on the pad 102.

The pads 102 may be coupled together in any shape or formation. In the configuration 300, the pads 102 are attached side-by-side in a linear configuration. Each display 108 may be positioned behind a respective pad 102. The display 108 may present information about the pad 102 or items 106 on the pad 102. The display 108 may also present information that a customer can use to retrieve the items 106. For example, the display 108 may present an order number, a customer name, or any other information that a customer may use to identify the items 106 that belong to the customer.

The pads 102 are coupled to each other along side surfaces 302 of the pads 102. The displays 108 are attached along back surfaces 304 of the pads 102. The displays 108 extend upwards from the pads 102. As a result, the displays 108 and the pads 102 form an L-shaped arrangement. The displays 108 may also be further from the customers than the items 106 when the customers approach the pads 102 to retrieve the items 106. The displays 108 may also be coupled to each other along side surfaces 306 of the displays 108. In this manner, the pads 102 and displays 108 may appear to form continuous surfaces.

Figure 4A:
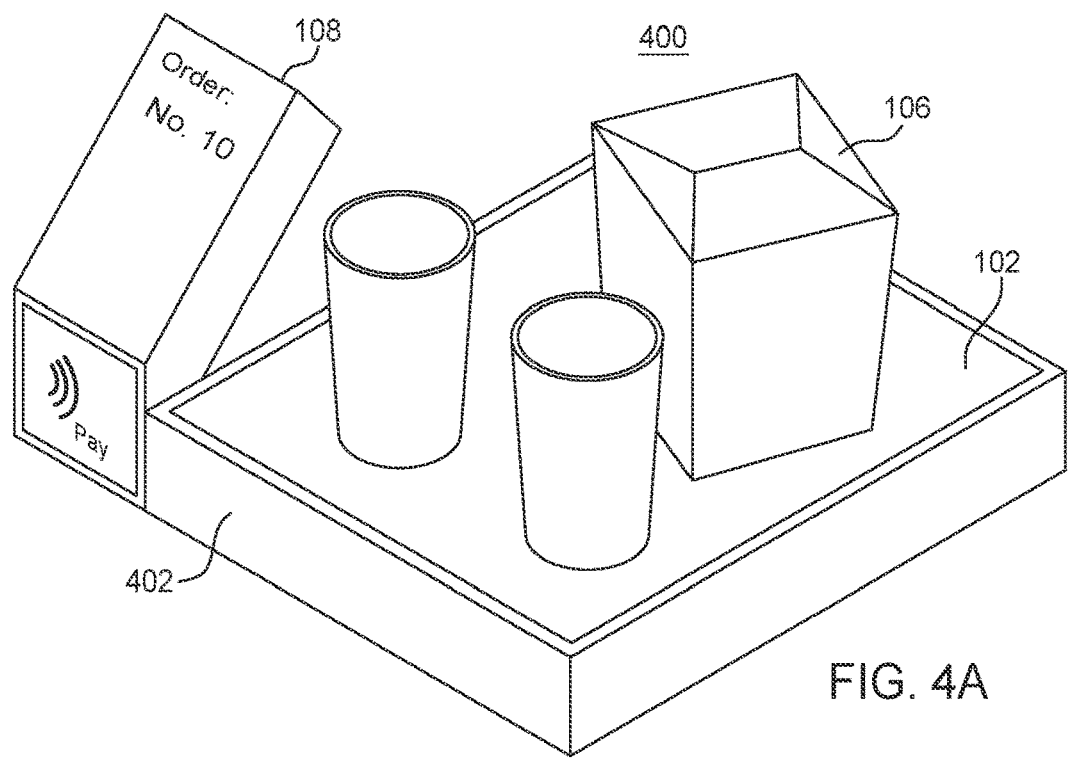
FIGS. 4A and 4B illustrate an example configuration of a pickup location.

FIG. 4A illustrates an example configuration 400 of a pickup location. As seen in FIG. 4A, the display 108 may be attached to a front surface 402 of the pad 102 and face the customer when the customer is retrieving items 106 from the pad 102. The display 108 may be positioned closer to the customer than the items 106 when the customer approaches the pad 102 to retrieve the items 106. The display 108 may be smaller than displays 108 in previous configurations. The display 108 may present instructions or a code that indicates to the customer whether the items 106 are intended for the customer.

Figure 4B:
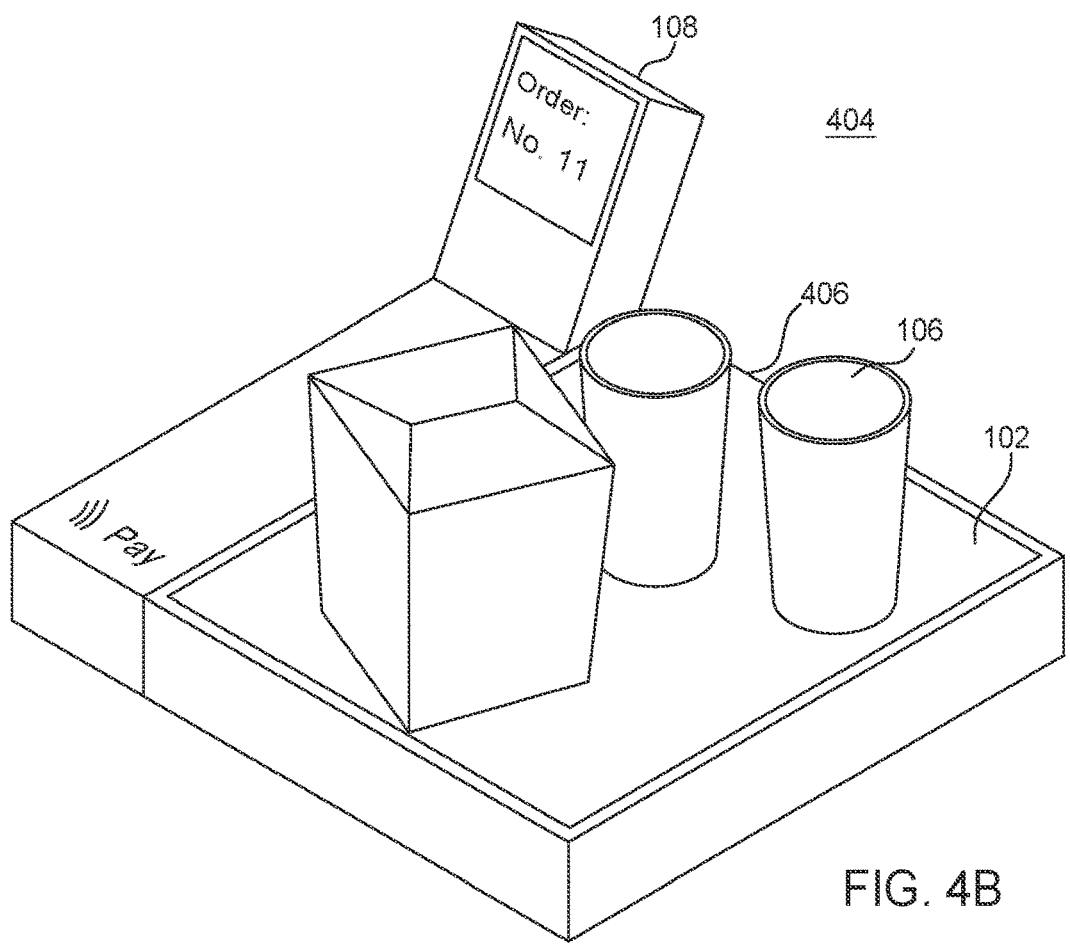

FIG. 4B illustrates an example configuration 404 of the pickup location. As seen in FIG. 4B, the display 108 may be coupled to a back surface 406 of the pad 102. The display 108 may be positioned further from the customer than the items 106 on the pad 102 when the customer approaches the pad 102 to retrieve the items 106. The display 108 may be smaller than displays 108 in previous configurations. Multiple items 106 may be positioned on the pad 102. The display 108 may present instructions or a code that indicates to the customer whether the items 106 are intended for the customer.

Figure 5A:
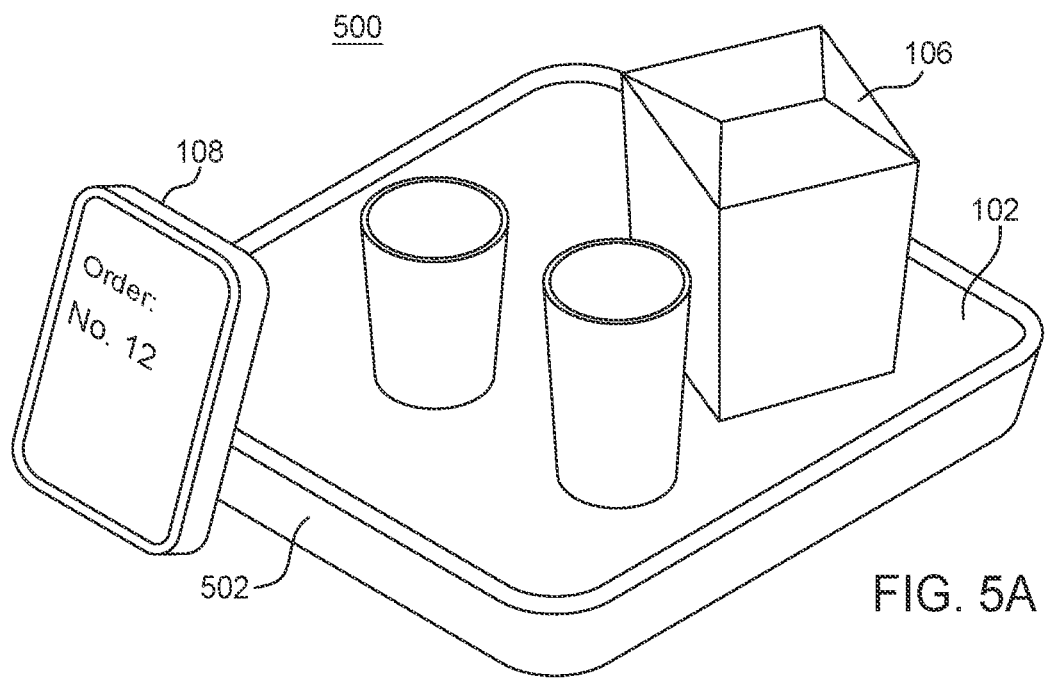
FIGS. 5A and 5B illustrate an example configuration of a pickup location.
Figure 5B:
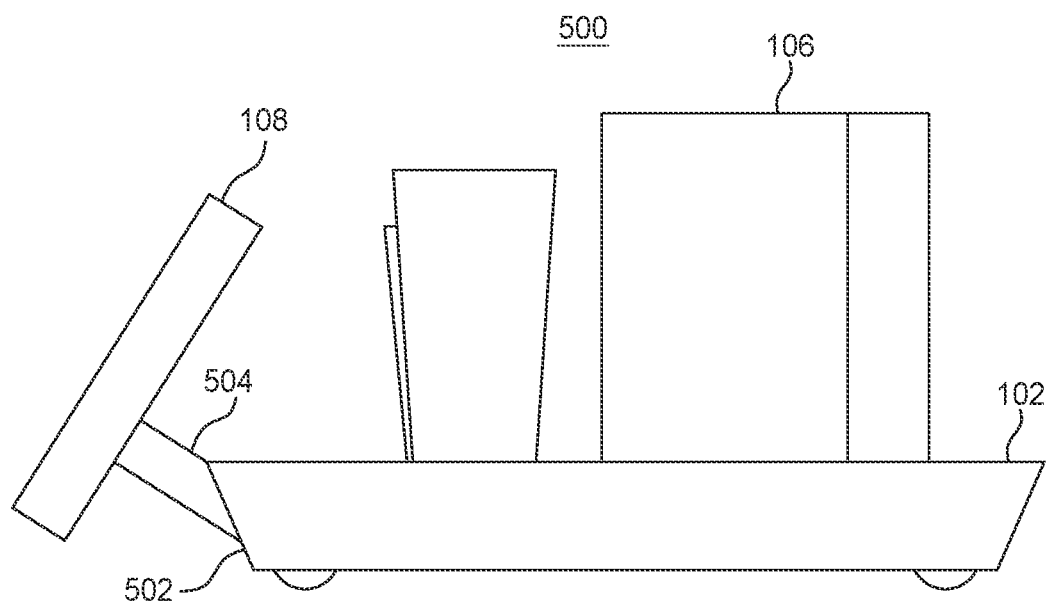

FIGS. 5A and 5B illustrate an example configuration 500 of a pickup location. FIG. 5A presents an isometric view of the pickup location. FIG. 5B presents a side view of the pickup location. As seen in FIGS. 5A and 5B, multiple items 106 may be positioned on the pad 102. Additionally, the display 108 may be connected to the pad 102 at a front surface 502 of the pad 102. The display 108 may be positioned closer to the customer than the items 106 when the customer approaches the pad 102 to retrieve the items 106. The display 108 may be attached to an arm 504 that is attached to the front surface 502 of the pad 102. The arm 504 may elevate the display 108 off the pad 102, and the arm 504 may tilt the display 108 towards the customer. In some embodiments, the arm 504 may allow the position and/or orientation of the display 108 to be adjustable for better viewing by the customer. The display 108 may be smaller than previously discussed displays 108.

Figure 6A:
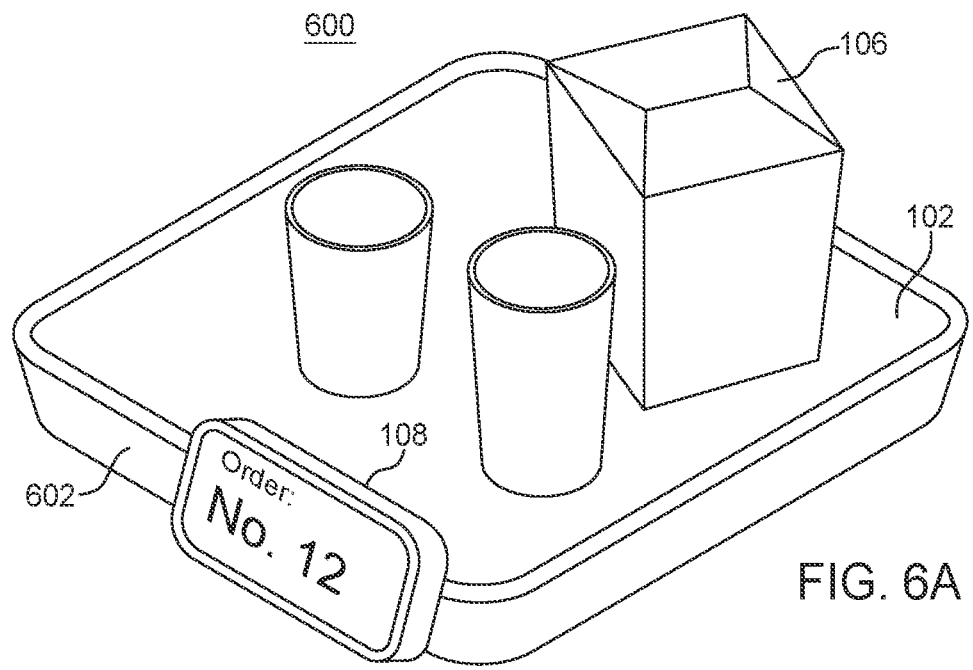
FIGS. 6A, 6B, 6C, 6D, 6E, and 6F illustrate example configurations of a pickup location.

FIG. 6A illustrates an example configuration 600 of a pickup location. As seen in FIG. 6A, one or more items 106 may be positioned on the pad 102. A display 108 is attached to a front surface 602 of the pad 102. The display 108 may be positioned closer to the customer than the items 106 when the customer approaches the pad 102 to retrieve the items 106. The display 108 may also be directed or angled towards the customer.

Figure 6B:
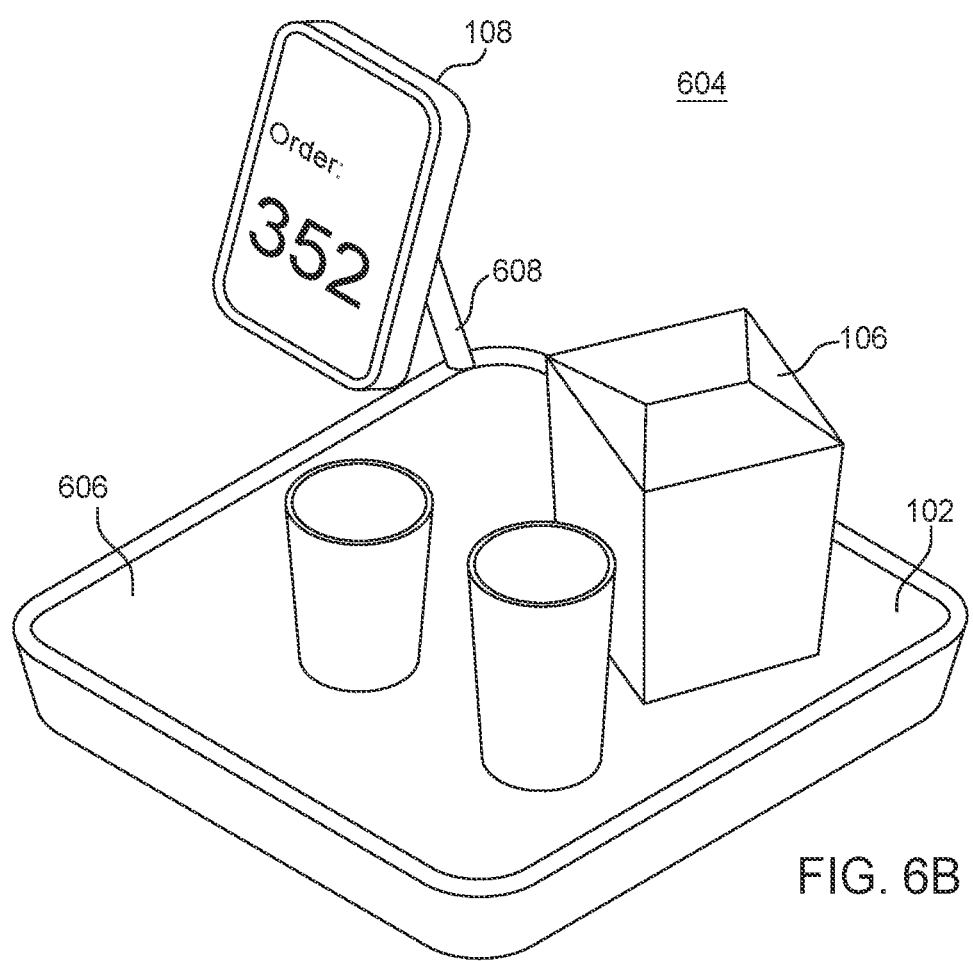

FIG. 6B illustrates an example configuration 604 of a pickup location. As seen in FIG. 6B, one or more items 106 are positioned on the pad 102. A display 108 is attached to a top surface 606 of the pad 102 by an arm 608. The display 108 may be elevated from the pad 102 by the arm 608. The arm 608 may also angle the display 108 towards a customer when the customer approaches the pad 102 to retrieve the items 106.

Figure 6C:
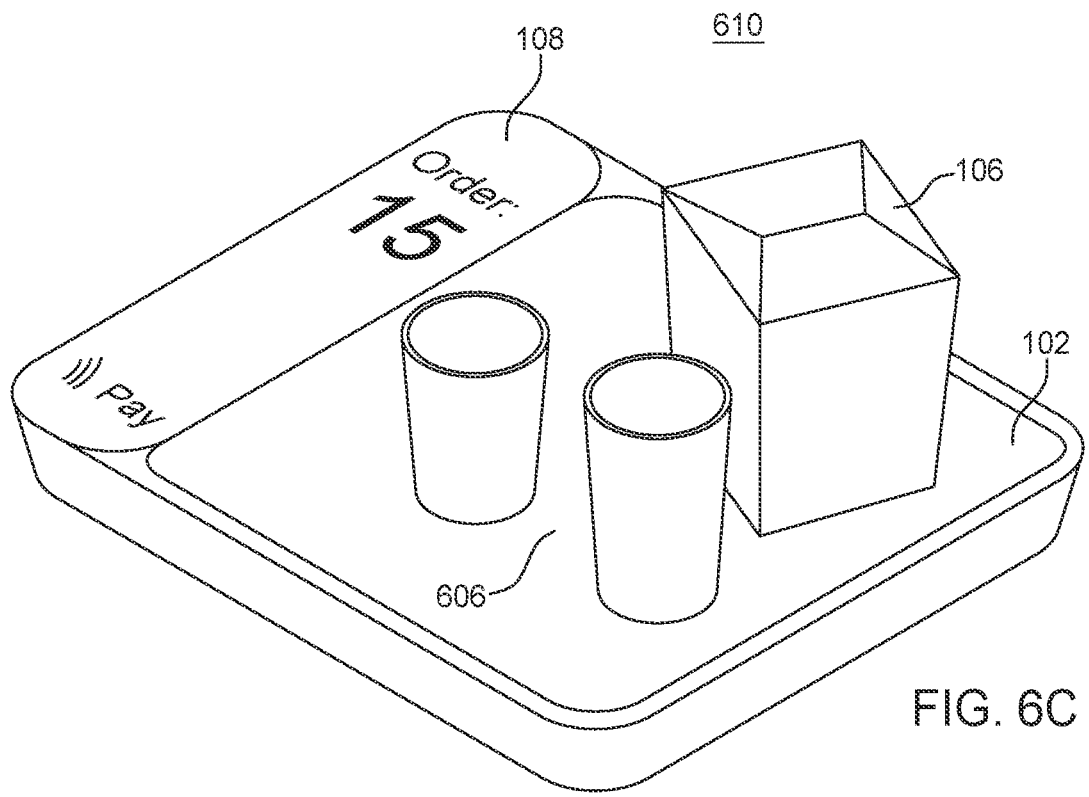

FIG. 6C illustrates an example configuration 610 of a pickup location. As seen in FIG. 6C, one or more items 106 are positioned on the pad 102. A display 108 is attached to the top surface 606 of the pad 102. The display 108 may extend across the top surface 606 of the pad 102. The display 108 may present information to the customer when the customer approaches the pad 102 to retrieve the items 106.

Figure 6D:
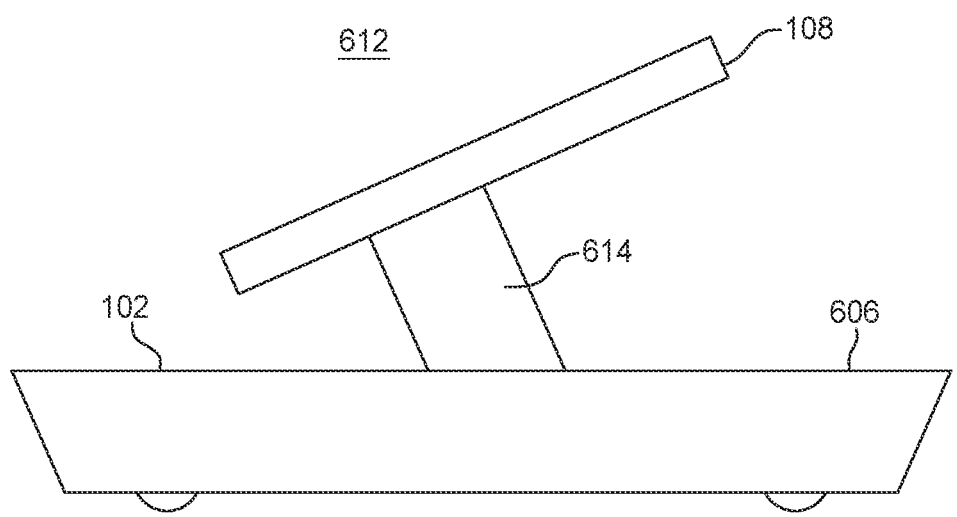

FIG. 6D illustrates an example configuration 612 of a pickup location. As seen in FIG. 6D, the display 108 is attached to the top surface 606 of the pad 102 by an arm 614. The arm 614 elevates the display 108 above the pad 102. Additionally, the arm 614 angles the display 108 relative to the pad 102.

Figure 6E:
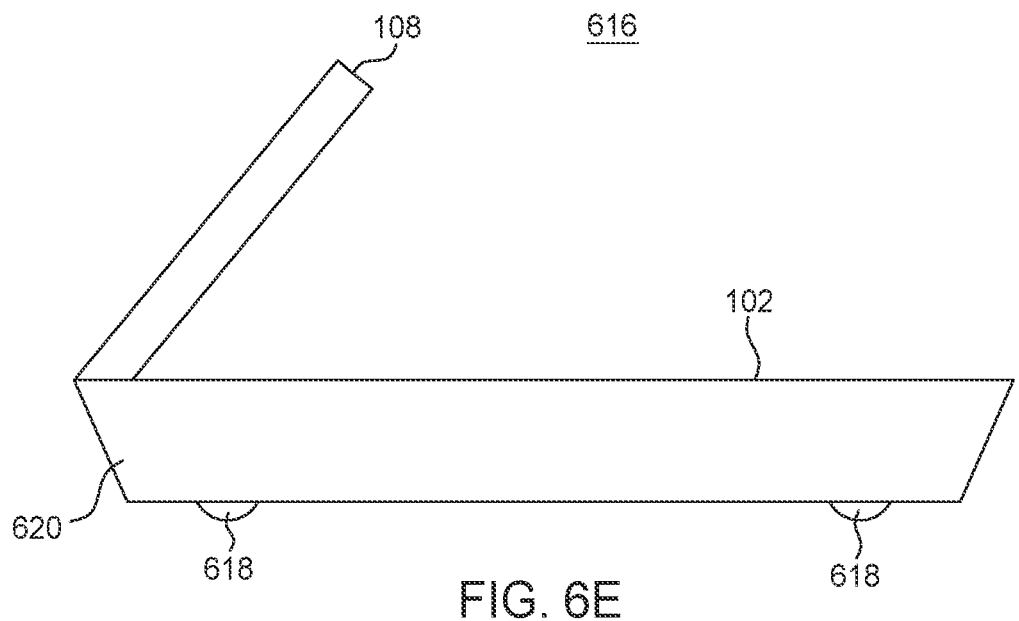

FIG. 6E illustrates an example configuration 616 of a pickup location. As seen in FIG. 6E, the pad 102 has legs 618 beneath the pad 102. The legs 618 may support the pad 102 on a surface. The display 108 is attached to the pad 102 along a back surface 620 of the pad 102. Additionally, the display 108 is angled relative to the pad 102. As a result, the display 108 may also serve as a backstop for items positioned on the pad 102.

Figure 6F:
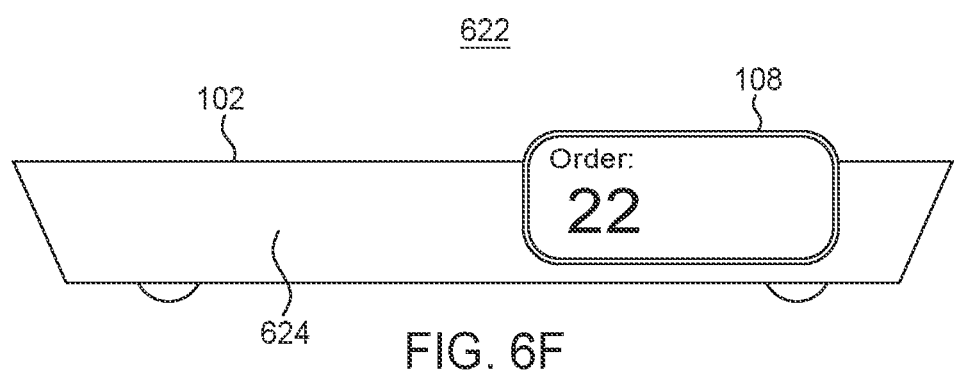

FIG. 6F illustrates an example configuration 622 of a pickup location. As seen in FIG. 6F, the display 108 is attached to the pad 102 on a surface 624 of the pad 102. The surface 624 may be a front or side surface of the pad 102. The display 108 may be positioned flat against the surface 624 of the pad 102. The display 108 may present information to the customer (e.g., an order number, a customer name, etc.) as the customer approaches the pad 102.

Figure 7A:
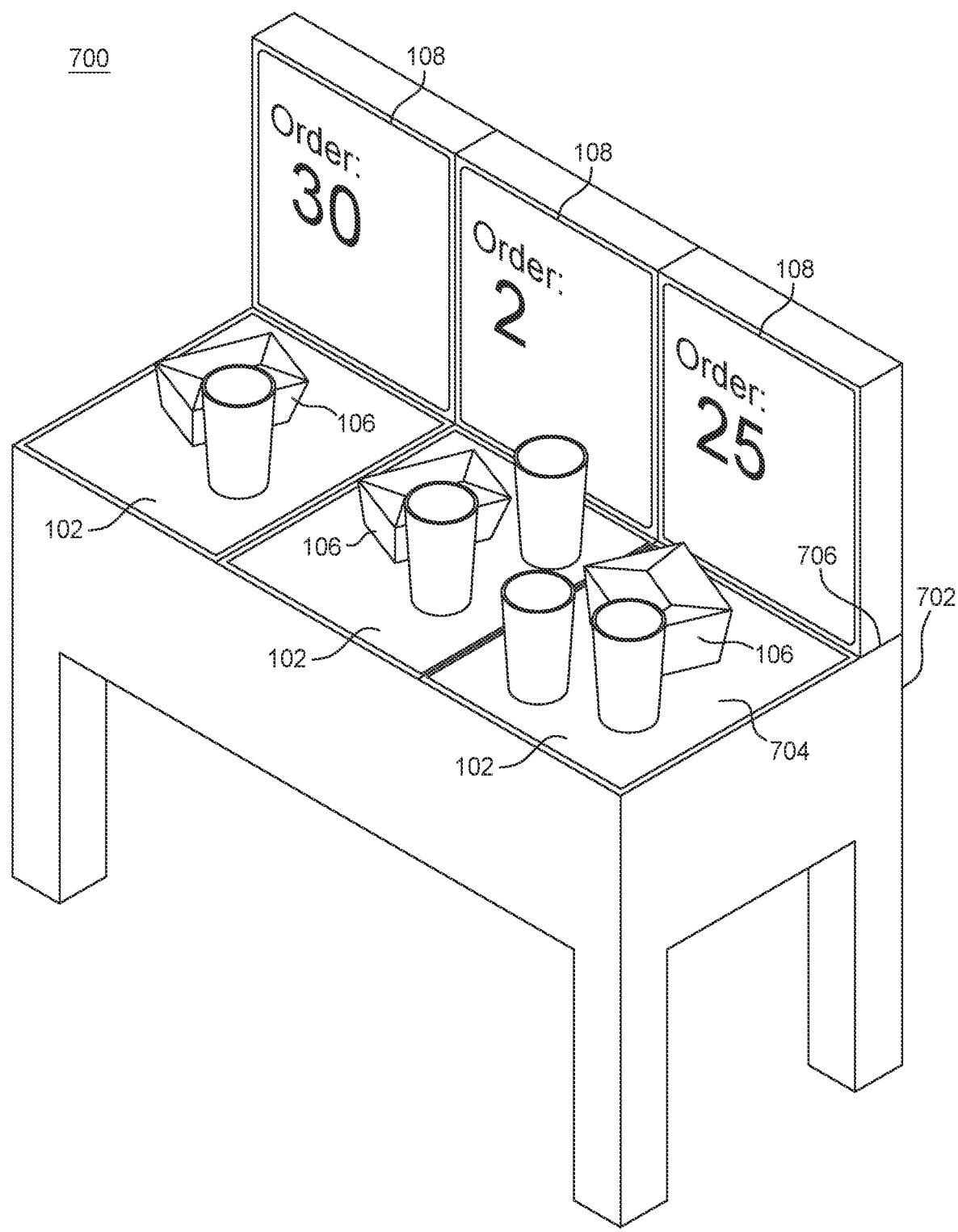
Figure 7B:
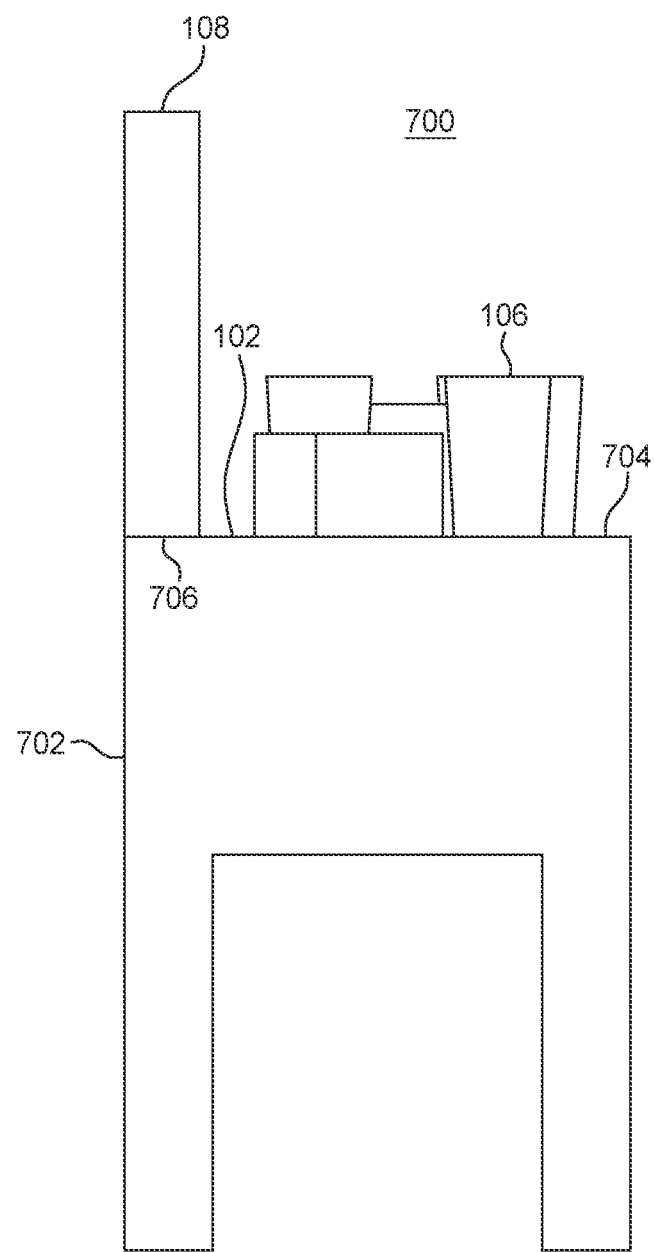

FIGS. 7A, 7B, and 7C illustrate an example configuration 700 of a pickup location. FIG. 7A presents a front view of the pickup location. FIG. 7B presents a side view of the pickup location. FIG. 7C presents a top-down view of the pickup location. As seen in FIGS. 7A, 7B, and 7C, the pickup location includes a table 702. Multiple pads 102 are arranged across a top surface 704 of the table 702. Items 106 may be positioned on the pads 102 for pickup. Additionally, displays 108 may be connected to the pads such that the displays 108 form a backstop for the pads 102.

The pads 102 are arranged along the top surface 704 of the table 702. In some embodiments, the pads 102 are attached to each other to form a linear arrangement across the top surface 704 of the table 702. The displays 108 may be attached to back surfaces 706 of the pads 102. The displays 108 may extend upwards from the pads 102 to form the backstop for the pads 102. The display 108 also present information that customers can use to determine which items 106 should be retrieved.

Figure 8:
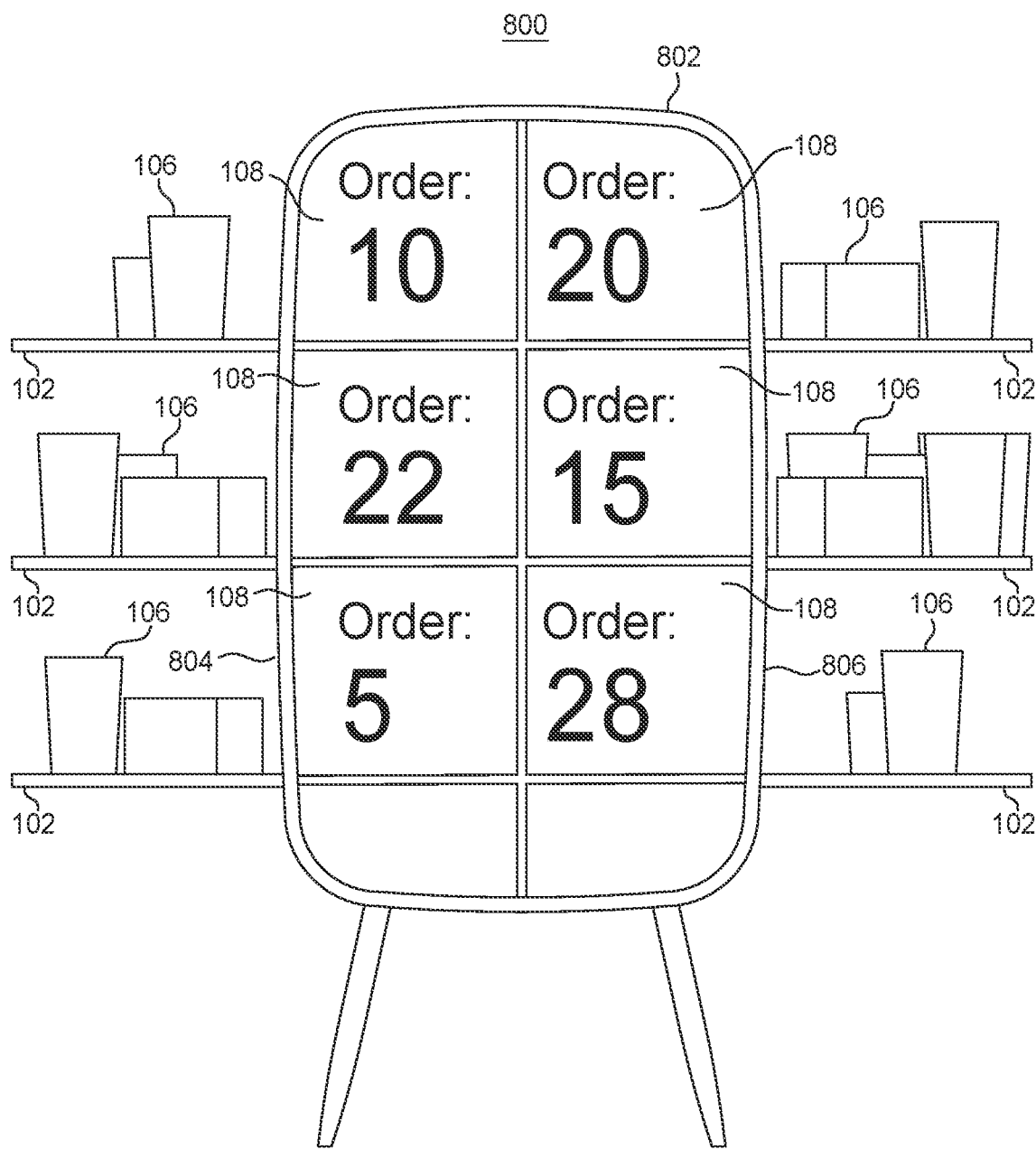
FIG. 8 illustrates an example configuration of a pickup location.

FIG. 8 illustrates an example configuration 800 of a pickup location. As seen in FIG. 8, the pickup location includes a vertical shelf or cabinet. The pads 102 may form the individual shelves. The displays 108 may be arranged on or form a central column 802. Each pad 102 may extend out from a side 804 or 806 of the column 802 at the position of the corresponding display 108. The pads 102 may form levels or layers. Items 106 may be positioned on the pads 102 at the different levels or layers. When a customer approaches the pickup location, the customer may view the information on the displays 108 to know which pad 102 holds the items 106 for the customer.

Figure 9A:
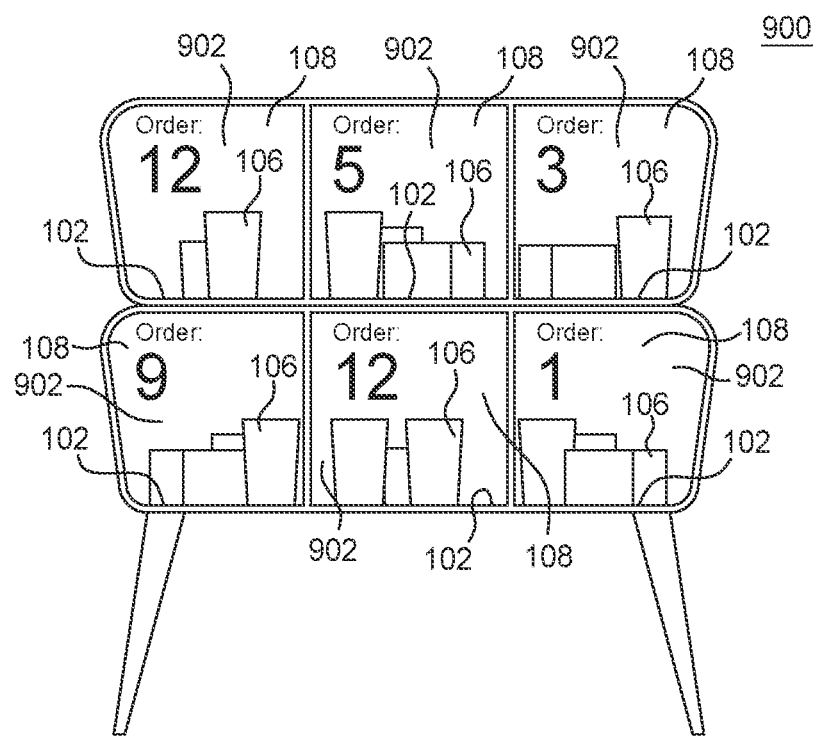
FIGS. 9A and 9B illustrate an example configuration of a pickup location.

FIG. 9A illustrates an example configuration 900 of a pickup location. As seen in FIG. 9A, the pickup location may resemble a cabinet. The pads 102 may be positioned within the cubbies 902 in the cabinet. Additionally, displays 108 may form the backs of each cubby 902. In some embodiments, the cubbies 902 may be enclosed spaces (e.g., using a door at the front of each cubby 902). The doors may include the displays 108.

The cubbies 902 in the cabinet are arranged in multiple layers. In the configuration 900, there are two levels of cubbies 902. Each cubby 902 includes a pad 102. Items 106 may be positioned on the pad 102 in each cubby 902. Each level of cubbies 902 may include any number of cubbies 902 and pads 102. Additionally, the cabinet may include any number of levels of cubbies 902.

Figure 9B:
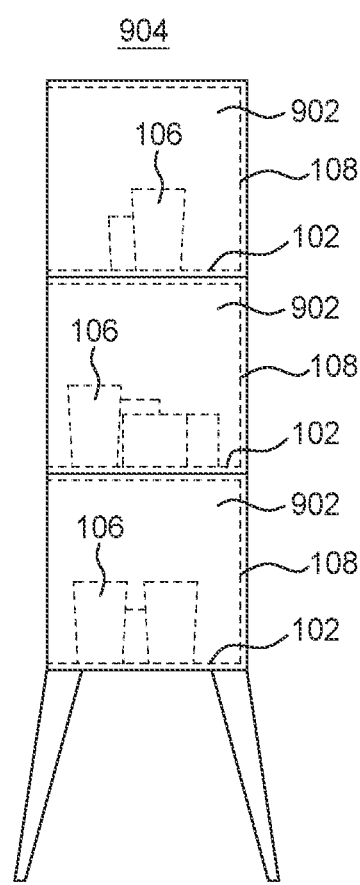

FIG. 9B illustrates an example configuration 904 of a pickup location. Similar to the configuration 900, the configuration 904 resembles a cabinet. In the configuration 904, there are three levels of cubbies 902 stacked on top of each other. Each cubby 902 holds a pad 102 and a display 108. Items 106 may be placed in the cubbies 902 on the pads 102.

Although not illustrated in FIGS. 2A, 2B, 3A, 3B, 4A, 4B, 5A, 5B, 6A, 6B, 6C, 6D, 6E, 6F, 7A, 7B, 7C, 8, 9A, and 9B, each of the configurations shown in these figures may include cameras 104, weight sensors, and/or shape sensors. The cameras 104, weight sensors, and/or shape sensors may be embedded in the pads 102. Some of the cameras 104 may be positioned outside of and directed towards the pads 102.

Figure 10:
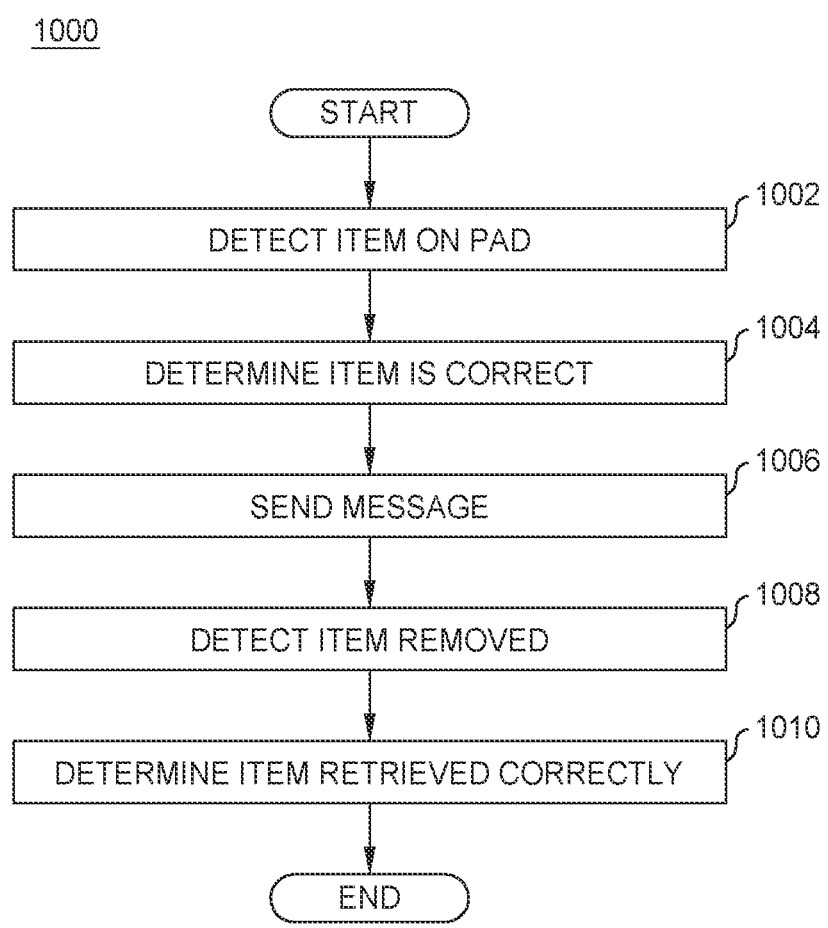
FIG. 10 is a flowchart of an example method performed by the system of FIGS. 1A, 1B, 1C, and 1D.

FIG. 10 is a flowchart of an example method 1000 performed by the system 100 of FIGS. 1A, 1B, 1C, and 1D. In particular embodiments, the computer system 112 performs the method 1000. By performing the method 1000, the computer system 112 ensures that the correct items are placed on pads and that the correct items are taken from the pads.

In block 1002, the computer system 112 detects that an item is positioned on a pad. For example, the computer system 112 may receive video from a camera directed at the pad and/or information from a weight sensor embedded in the pad. The video and/or the information may indicate that the item is positioned on the pad. In block 1004, the computer system 112 determines that the item on the pad is correct. For example, the computer system 112 may compare a shape of the item in the video with a known shape for the correct item. As another example, the computer system 112 may compare a detected weight of the item on the pad with a known weight for the correct item. If the shapes and/or weights match or are substantially close (e.g., within 1% to 10%), the computer system 112 determines that the item on the pad is correct.

In block 1006, the computer system 112 communicates a message to a person indicating that the item is ready for pickup. For example, the computer system 112 may communicate the message to a device of the user (e.g., a mobile phone). When the person views the message, the person will understand that the item is ready for pickup. In block 1008, the computer system 112 detects that the item was removed from the pad. For example, the computer system 112 may determine that the video from the camera shows that the item has been removed. As another example, the computer system 112 may determine from a detected weight for the pad that the item has been removed.

In block 1010, the computer system 112 determines that the item was retrieved correctly. For example, the person may scan a code at the pickup location to provide identification prior to retrieving the item. The computer system 112 may determine from the identification whether the correct person took the item. If the item was not retrieved correctly, the computer system 112 may communicate an alert or message indicating that the wrong item was taken. The person who took the item may return the item to the pad upon seeing the alert or message. In this manner, the computer system 112 reduces the instances of the incorrect items being taken, which reduces the amount of computing resources that the computer system 112 uses processing complaints, returns, and/or reorders.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
   a pad comprising a first zone and a second zone, wherein the second zone comprises a plurality of illuminated reference indicators co-located at adjacent angles situated around the second zone;
   a weight sensor disposed within the second zone of the pad and arranged to detect a weight of an item when the item is positioned on the second zone of the pad;
   a shape sensor arranged with a viewpoint of the first zone of the pad to detect a shape of the item when the item is positioned on the second zone of the pad;
   a display coupled to the first zone of the pad; and
   a processor configured to:
     detect that the item is positioned on the second zone of the pad based on the detected weight;
     identify a first shape characteristic of the item based on the shape of the item captured from the viewpoint of the shape sensor when the item is positioned on the second zone of the pad;
     responsive to identifying the first shape characteristic of the item, determine that the first shape characteristic matches a second shape characteristic of the item;
     responsive to determining that the first shape characteristic and the second shape characteristic of the item match, generate a graphical interface comprising at least an alpha-numeric character associated with the item positioned on the second zone of the pad, and cause the graphical interface to display on the display coupled to the first zone of the pad;
     responsive to causing the graphical interface to display on the display coupled to the first zone of the pad, cause the plurality of illuminated reference indicators co-located at adjacent angles situated around the second zone of the pad to illuminate at reference points surrounding the item positioned on the second zone of the pad;
     receive an identification of a user;
     detect, based on the identification, that a wrong user retrieved the item from the pad; and
     responsive to the wrong user retrieving the item from the pad, communicate an alert to an administrator and flash at least one of the plurality of illuminated reference indicators co-located at adjacent angles situated around the second zone of the pad.

2. The system of claim 1, wherein the shape sensor is a camera directed at the pad.

3. The system of claim 2, wherein the camera is positioned above the pad.

4. The system of claim 1, further comprising:
   a table comprising the pad positioned on a top surface of the table, wherein the display is positioned on the top surface of the table;
   wherein the processor is further configured to:
     responsive to causing the plurality of illuminated reference indicators co-located at adjacent angles situated around the second zone of the pad to illuminate, communicate a message indicating that an order is ready for pickup; and
   wherein the shape sensor is directed at the table such that the viewpoint of the shape sensor detects the top surface of the table, the pad, the plurality of illuminated reference indicators co-located at adjacent angles situated around the second zone of the pad, and the display.

5. A method comprising:
   detecting, by a weight sensor disposed within a second zone of a pad, a weight of an item when the item is positioned on the second zone of the pad, wherein the pad comprises a first zone and the second zone, and wherein the second zone comprises a plurality of illuminated reference indicators co-located at adjacent angles situated around the second zone;
   detecting, by a shape sensor arranged with a viewpoint that includes the first zone of the pad, a shape of the item when the item is positioned on the second zone of the pad;
   detecting, by a computer system, that the item is positioned on the second zone of the pad based on the detected weight;
   identifying, by the computer system, a first shape characteristic of the item based on the shape of the item captured from the viewpoint of the shape sensor when the item is positioned on the second zone of the pad;

responsive to identifying the first shape characteristic of the item, determining, by the computer system, that the first shape characteristic matches a second shape characteristic of the item; and responsive to determining that the first shape characteristic and the second shape characteristic of the item match, generating a graphical interface comprising at least an alpha-numeric character associated with the item positioned on the second zone of the pad, and causing the graphical interface to display on a display coupled to the first zone of the pad; and responsive to causing the graphical interface to display on the display coupled to the first zone of the pad, causing the plurality of illuminated reference indicators co-located at adjacent angles situated around the second zone of the pad to illuminate at reference points surrounding the item positioned on the second zone of the pad;

receiving an identification of a user;

detecting, based on the identification, that a wrong user retrieved the item from the pad; and responsive to the wrong user retrieving the item from the pad, communicating an alert to an administrator and flashing at least one of the plurality of illuminated reference indicators co-located at adjacent angles situated around the second zone of the pad.

6. The method of claim 5, wherein the shape sensor is a camera directed at the pad.

7. The method of claim 6, wherein the camera is positioned above the pad.

8. A non-transitory computer readable medium storing instructions that, when executed by a processor, cause the processor to:

detect, by a weight sensor disposed within a second zone of a pad, a weight of an item when the item is positioned on the second zone of the pad, wherein the pad comprises a first zone and the second zone, and wherein the second zone comprises a plurality of illuminated reference indicators co-located at adjacent angles situated around the second zone;

detect, by a shape sensor arranged with a viewpoint that includes the first zone of the pad, a shape of the item when the item is positioned on the second zone of the pad;

detect that the item is positioned on the second zone of the pad based on the detected weight;

identify a first shape characteristic of the item based on the shape of the item captured from the viewpoint of the shape sensor when the item is positioned on the second zone of the pad;

responsive to identifying the first shape characteristic of the item, determine that the first shape characteristic matches a second shape characteristic of the item; and responsive to determining that the first shape characteristic and the second shape characteristic of the item match, generate a graphical interface comprising at least an alpha-numeric character associated with the item positioned on the second zone of the pad, and cause the graphical interface to display on a display coupled to the first zone of the pad; and responsive to causing the graphical interface to display on the display coupled to the first zone of the pad, cause the plurality of illuminated reference indicators co-located at adjacent angles situated around the second zone of the pad to illuminate at reference points surrounding the item positioned on the second zone of the pad;

receive an identification of a user;

detect, based on the identification, that a wrong user retrieved the item from the pad; and responsive to the wrong user retrieving the item from the pad, communicate an alert to an administrator and flash at least one of the plurality of illuminated reference indicators co-located at adjacent angles situated around the second zone of the pad.

9. The medium of claim 8, wherein the shape sensor is a camera directed at the pad.

* * * * *